(12) United States Patent
Smith (10) Patent No.: US 10,264,743 B2
(45) Date of Patent: Apr. 23, 2019

(54) AEROPONIC SYSTEM

(71) Applicant: Larry Smith, Chattaroy, WA (US)

(72) Inventor: Larry Smith, Chattaroy, WA (US)

( * ) Notice: Subject to any disclaimer, the term of this patent is extended or adjusted under 35 U.S.C. 154(b) by 522 days.

(21) Appl. No.: 14/273,896

(22) Filed: May 9, 2014

(65) Prior Publication Data

US 2015/0319947 A1 Nov. 12, 2015

(51) Int. Cl.
*A01G 31/02* (2006.01)

(52) U.S. Cl.
CPC ............ *A01G 31/02* (2013.01); *Y02P 60/216* (2015.11)

(58) Field of Classification Search
CPC ........ A01G 31/06; A01G 31/00; A01G 1/001; A01G 9/022; A01G 9/023; A01G 27/005; A01G 29/00; A01G 2031/006; A01G 31/001; A01G 31/045; A01G 9/18; A01G 2031/003; A01G 25/097; A01G 27/003; A01G 9/02; A01G 31/02; Y02P 60/216
USPC .................................................... 47/62, 62 A
See application file for complete search history.

(56) References Cited

U.S. PATENT DOCUMENTS

| | | | | |
|---|---|---|---|---|
| 2,431,890 A | * | 12/1947 | Raines | A01H 4/001 47/58.1 R |
| 3,660,933 A | | 5/1972 | Wong, Jr. | |
| 4,332,105 A | | 6/1982 | Nir | |
| 4,392,327 A | | 7/1983 | Sanders | |
| 4,488,377 A | * | 12/1984 | Sjostedt | A01G 31/00 47/59 R |
| 4,543,744 A | | 10/1985 | Royster | |
| 4,976,064 A | * | 12/1990 | Julien | A01G 31/02 239/545 |
| 5,040,330 A | | 8/1991 | Belgiorno | |
| 5,201,141 A | | 4/1993 | Ahm | |
| 5,394,647 A | | 3/1995 | Blackford, Jr. | |
| 6,216,390 B1 | | 4/2001 | Peregrin Gonzalez | |
| 6,233,870 B1 | | 5/2001 | Horibata | |
| 7,823,328 B2 | | 11/2010 | Walhovd | |
| 8,065,833 B2 | | 11/2011 | Triantos | |
| 8,181,391 B1 | | 5/2012 | Giacomantonio | |
| 8,225,549 B2 | | 7/2012 | Simmons | |
| 8,250,809 B2 | | 8/2012 | Simmons | |

(Continued)

FOREIGN PATENT DOCUMENTS

EP 0496911 B1 9/1995

OTHER PUBLICATIONS

PCT Search Report and Written Opinion dated Sep. 18, 2015 for PCT Application No. PCT/US15/28029, 10 pages.

*Primary Examiner* — Joshua J Michener
*Assistant Examiner* — George Andonyan
(74) *Attorney, Agent, or Firm* — Lee & Hayes, P.C.

(57) ABSTRACT

An aeroponic root system comprises a plant cell having a first root chamber coupled to a second root chamber. A perforated divider may be disposed between the first root chamber and the second root chamber. In some examples, a fluid delivery system may convey water, nutrients, oxygen (e.g., purified oxygen gas), and/or carbon dioxide to the plant according to corresponding delivery schedules. For instance, water and oxygen may be conveyed into the first and second root chambers via a main supply line. Carbon dioxide may be conveyed to a base of the plant via a carbon dioxide delivery ring. In some instances, the delivery schedules may be determined by a type of the plant and/or a growth stage of the plant.

14 Claims, 8 Drawing Sheets

(56) References Cited

U.S. PATENT DOCUMENTS

| | | |
|---|---|---|
| 8,261,486 B2 | 9/2012 | Bissonnette et al. |
| 8,516,743 B1 | 8/2013 | Giacomantonio |
| 8,549,788 B2 | 10/2013 | Bryan, III |
| 8,667,734 B2 | 3/2014 | Johnson et al. |
| 9,144,206 B1* | 9/2015 | Rubanenko ............ A01G 31/02 |
| 2005/0034367 A1 | 2/2005 | Morrow et al. |
| 2005/0198897 A1 | 9/2005 | Wainright et al. |
| 2005/0217177 A1 | 10/2005 | Littge |
| 2005/0241231 A1* | 11/2005 | Bissonnette ........... A01G 31/00 47/81 |
| 2005/0252080 A1 | 11/2005 | Wright |
| 2006/0053691 A1 | 3/2006 | Harwood et al. |
| 2006/0156624 A1 | 7/2006 | Roy et al. |
| 2007/0113472 A1 | 5/2007 | Plowman |
| 2008/0163547 A1 | 7/2008 | Sade et al. |
| 2009/0126269 A1 | 5/2009 | Wilson et al. |
| 2009/0151248 A1 | 6/2009 | Bissonnette et al. |
| 2011/0005131 A1 | 1/2011 | Smits et al. |
| 2011/0061296 A1 | 3/2011 | Simmons |
| 2011/0061297 A1 | 3/2011 | Simmons |
| 2011/0252705 A1 | 10/2011 | Van Gemert et al. |
| 2012/0005957 A1 | 1/2012 | Downs, Sr. |
| 2012/0090236 A1 | 4/2012 | Orr |
| 2012/0216459 A1 | 8/2012 | Currier |
| 2012/0240458 A1 | 9/2012 | Ganske |
| 2013/0019524 A1 | 1/2013 | Collin |
| 2013/0160362 A1 | 6/2013 | Daas et al. |
| 2013/0212940 A1* | 8/2013 | Blyden ................. A01G 9/022 47/65.8 |
| 2014/0000162 A1 | 1/2014 | Blank |
| 2014/0000163 A1 | 1/2014 | Lin |

* cited by examiner

AEROPONIC SYSTEM

BACKGROUND

Indoor farming systems must replace the sunlight, water, and nutrients typically found in a plant's natural environment. A potted plant may receive the sustenance necessary to yield fruit from sunlight through a window (e.g., a pane of a greenhouse) and/or commercial light fixtures, water periodically poured into the base soil by a caretaker and nutrients from the soil and/or added to the water. Many hydroponic and aeroponic systems have been developed to provide plants everything they require in a more automated or controlled manner.

Hydroponic indoor farming systems provide a pool of water, often with added nutrients, for the roots of a plant to grow into. Aeroponic indoor farming systems let the roots grow into open space, rather than retain them in a pot or a water pool. Both systems have advantages and drawbacks.

For instance, the exposed roots of aeroponic systems can make the plant vulnerable to bacteria and disease. Along with proper sterilization of equipment, it is also vital that aeroponic systems avoid over-saturating the plant with any particular sustenance substance (e.g., water, nutrients, light, oxygen, or carbon dioxide), which could make the plant susceptible to *pythium* induced root rot. Aeroponic systems must find a balance between maximizing the sustenance provided to the plant while minimizing the threat of root rot and other plant diseases. Accordingly, there remains a need for improved aeroponic systems.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As discussed above, aeroponic systems provide nourishment to plants to replace the nourishment found in their natural environment. However, the high degree of variability amongst plants makes it difficult to provide optimal amounts of nourishing substances throughout their lives.

This disclosure is directed to an aeroponic system which may comprise a plant cell and a fluid delivery system. The plant cell may comprise a first root chamber connected to a second root chamber, for instance, by a perforated divider. The fluid delivery system may convey water and oxygen into the first and/or second root chambers via first and second flow paths, respectively, formed by a plurality of interconnected components. The fluid delivery system may comprise a fluid delivery loop in each of the root chambers. In some examples, multiple partitioned root chambers in conjunction with the fluid delivery system may provide oxygen and/or water in a uniform distribution to a root system of a plant. For instance, the root system may grow into the first and/or second root chambers, wrapping around the fluid delivery system. But, even as the root system becomes larger and denser, the system described herein may still provide ample amounts of oxygen and water to every portion of the root system uniformly and in optimal amounts.

In some examples, the fluid delivery system may convey one or more fluids into the plant cell according to one or more fluid delivery schedules. For instance, water may be conveyed from a water source through a main supply line into the first and/or second root chambers. The water may comprise a nutrient solution. Oxygen may be conveyed from an oxygen source to the first and/or second root chambers using the same supply line used to convey the water. The delivery schedules may be determined and/or adjusted based on a type of plant being provided fluids and/or a growth stage of the plant (e.g., a seedling stage, a vegetative stage, a flowering stage, combinations thereof, and/or variations thereof). In some embodiments, the oxygen provided to the roots of the plant disposed in the first and/or second root chambers may be purified oxygen gas, which may increase a yield of the plant.

In some embodiments, the fluid delivery system may convey carbon dioxide from a carbon dioxide source to a plant according to a carbon dioxide delivery schedule. A carbon dioxide delivery ring may be disposed around a stem or base of the plant so that the carbon dioxide is distributed to the individual plant. In some examples, multiple plants may each have a carbon dioxide delivery ring disposed around their base or stem. Rather than flood the entire room housing the plants with carbon dioxide, the carbon dioxide delivery rings may provide carbon dioxide to each plant on an individual basis, thereby avoiding risks to people tending the plants (e.g., risks of asphyxiation).

In some examples, a schedule log may comprise a water delivery schedule, an oxygen delivery schedule, and/or a carbon dioxide delivery schedule. The delivery schedules may be adjustable for each growth stage of the plant. The delivery schedules may provide a degree of control over the plant's growing environment throughout its life such that precise amounts of fluids (e.g., water, oxygen, and/or carbon dioxide) may be provided to the plant at precise times. The high degree of control may increase a plant's yield during a flowering stage while mitigating the risk of root diseases, such as *pythium*. In some instances, the schedule logs may correspond to growth stages that may depend on the type of plant. For example, a plant may comprise a one month vegetative stage followed by a two month flowering stage. The plant may comprise a two week, four week, six week, or eight week vegetative state, followed by a two week, four week, six week, eight week, ten week, or twelve week flowering stage. A duration of the vegetative state and/or the flowering state may depend on a type of the plant. The plant may be provided fluids according to a delivery schedule based on the growth stages of that type of plant.

Multiple and varied example implementations and embodiments are described throughout. However, these examples are merely illustrative and other implementations and embodiments of an aeroponic system may be implemented without departing from the scope of the disclosure. For instance, the implementations, or portions thereof, may be rearranged, combined, used together, duplicated, partially omitted, omitted entirely, and/or may be otherwise modified to arrive at variations on the disclosed implementations.

Illustrative Cell of an Aeroponic System

Figure 1:
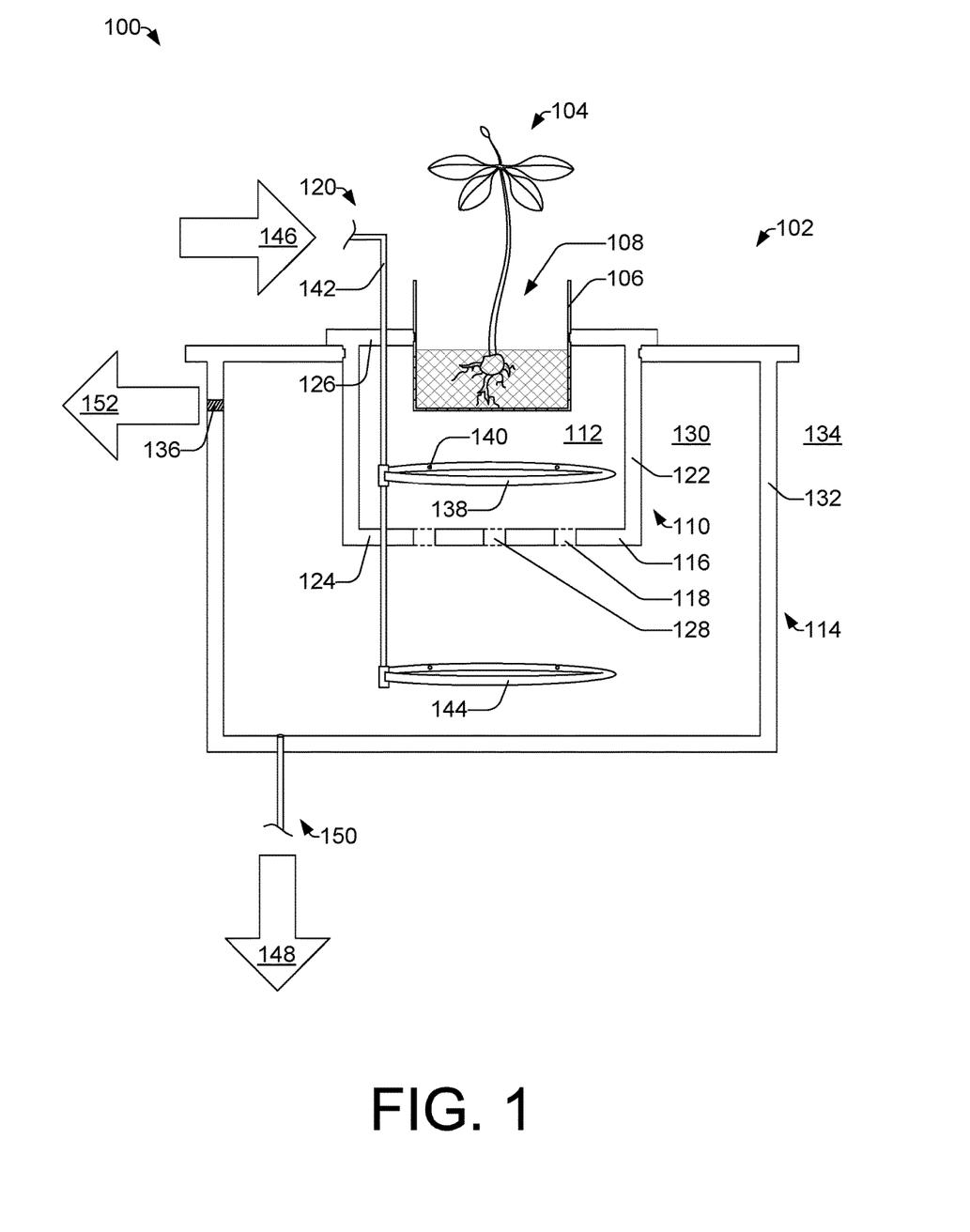
FIG. 1 illustrates an example aeroponic system comprising a cell for growing a plant.

FIG. 1 illustrates an example aeroponic system 100 comprising a cell 102 for growing a plant 104. In some examples, the cell 102 may comprise a perforated receptacle 106 for receiving a base 108 of the plant 104. The perforated receptacle 106 may be disposed in a top opening of a first enclosure 110. The first enclosure 110 may partially surround and/or enclose the perforated receptacle 106, such that the perforations of the perforated receptacle 106 connect to an interior space 112 enclosed by the first enclosure 110. A second enclosure 114 may at least partially surround the first enclosure 110, with a divider 116 between the first and second enclosures 110 and 114 having an opening or passageway 118 connecting the first enclosure 110 to the second enclosure 114. A fluid delivery system 120 may pass into the first enclosure 110 and the second enclosure 114. In some examples, the fluid delivery system 120 may comprise a plurality of interconnected components that define a flow path or multiple flow paths, as discussed in greater detail below.

In some embodiments, the perforated receptacle 106 may comprise a rigid or semi-rigid container such as a basket. In some instances, the base 108 of the plant 104 may establish in a growing medium, such as soil, rocks, plastic beads, glass marbles, hygroten, foam, and/or rockwool, retained by the perforated receptacle 106. The perforated receptacle may have a depth of about 2 inches, 4 inches, 6 inches, for example, or any depth suitable to accommodate the base of the plant 108. In other examples, the base of the plant 108 may be secured by the growing medium itself, such that the perforated receptacle 106 may be omitted. The base 108 of the plant 104 may comprise the roots of the plant 104 extending from a stem and/or a seed of the plant 104. The plant 104 may be in a seedling stage, a vegetative stage, or may comprise merely a germinated seed. In some examples, the base 104 of the plant 108 may comprise a seed with a stem extending upward and protruding roots extending downward. The plant 104 may comprise any type of plant with multiple growth stages. The plant 104 may comprise any type of plant that may be cultivated with indoor farming systems.

In some examples, the first enclosure 110 may be positioned at least partially around the perforated receptacle 106 and/or the base 108 of the plant 104. The first enclosure 110 may comprise any type of container, such as a bucket, to form sides 122 and a bottom 124. In some examples, a lid may form a top 126. The perforated receptacle 106 may fit into a hole in the top 126 of the first enclosure 110, held in place with a lip, friction fitting, snap fit, adhesive, epoxy, clamps, clips, crimps, nails, screws, bolts, gravity, or any other coupling method. In some embodiments, depending on a shape of the cell 102, the perforated receptacle 106 may fit into the first enclosure 110 at a side of the first enclosure 110 rather than at the top 126.

In some examples, the sides 122, the bottom 124, and/or the top 126 comprise an opening 128 or a plurality of openings. In instances where the first enclosure 110 is enclosed by the second enclosure 114, the sides 122, the bottom 124, and/or the top 126 may comprise the divider 116 between the first and second enclosures 110 and 114 and the opening 128 or plurality of openings may comprise the passageway 118 for roots from the plant 104 to travel through. Although FIG. 1 illustrates a first enclosure 110 having a plurality of openings on the bottom 124, in other embodiments an opening 128 may be disposed on the side 122, the top 126, the bottom 124, or any combination thereof. A configuration of the opening 128 or the plurality of openings may depend, at least in part, on a type of plant the plant 104 comprises and/or a shape of the first enclosure 110.

In some embodiments, the cell 102 may comprise the second enclosure 114 at least partially enclosing the first enclosure 110. The second enclosure 114 may enclose a second interior space 130 which, in some examples, may be a partially or fully open-air space. The first enclosure 110 and the first interior space 112 enclosed by the first enclosure 110 may be within the second interior space 130 of the second enclosure 114.

In some examples, the first and/or the second interior spaces 112 and 130 are considered "open air" because a majority of the unoccupied volume comprises air enclosed by the first and second enclosures 110 and 114. However, some of the volume may be occupied by additional monitoring, sensing, lighting, structural support, or any other type of growing hardware or equipment. In fact, some of the volume of the interior spaces 112 and 130 may be occupied by the fluid delivery system 120, as will be discussed in greater detail below.

In some embodiments, a wall 132 of the second enclosure 114 may divide the second interior space 130 from an exterior 134. The wall 132 may have a vent 136 disposed on it or formed into it. The vent 136 may comprise an opening with a removable cover or no cover at all. In some examples, the vent 136 may provide a path for stagnant air to escape the cell 102 and/or for some air from the exterior 134 to flow into the cell 102. Although the first and second enclosures 110 and 114 enclose the interior spaces 112 and 130, respectively, the interior spaces 112 and 130 may still be connected to the exterior 134 via the vent 136. As such, in some examples, the cell 102 may not be air-tight. However, in other examples, the vent 136 may be omitted, or a cover may attach to the vent 136, such that the cell 102 may be air-tight or substantially air-tight.

In some examples, the perforated receptacle 106, the first enclosure 110, and/or the second enclosure 114 may comprise any material substantially rigid or semi-rigid enough to maintain structural integrity during use. For example, the perforated receptacle 106, the first enclosure 110, and/or the second enclosure 114 may comprise metal, wood, ceramic, glass, fiberglass, plastic, composites and/or combinations thereof. In some embodiments, the first and second enclosures 110 and 114 may comprise plastic buckets. For instance, the first enclosure 110 may comprise a cylindrical five-gallon bucket and the second enclosure 114 may comprise a rectangular 14-gallon bucket. In some examples, both enclosures 110 and 114 may be cylindrical or both may be rectangular. In fact, the first and second enclosures 110 and 114 may comprise any shape and they may comprise the same shape or different shapes. In other examples, the first and second enclosures 110 and 114 may comprise another type of containment structure different than a bucket, such as a covered frame or a box. In some examples, the cell 102 may be one of multiple plant cells in a cell cluster, in which case, the second enclosure 114 of the cell 102 may be configured to mount in a larger frame of the cell cluster.

In some embodiments, the aeroponic root system 100 may comprise the fluid delivery system 120 passing into the first enclosure 110 and, in some examples, the second enclosure 130. The fluid delivery system 120 may comprise a plurality of interconnected delivery components including a delivery loop 138 forming a first flow path into the first interior space 112 enclosed by the first enclosure 110. In some examples, the delivery loop 138 may comprise a ring of tubing with an aperture 140 or multiple apertures disposed on the tubing. In other examples, the delivery loop 138 may comprise a square or rectangular profile, elongated circular profile, or any other shape. In some examples the delivery loop 138 may merely comprise a single linear tube. The delivery loop 138 may connect to a main supply line 142 via a T-fitting. In some examples, a mister, may be disposed on the delivery loop 138 for dispensing the fluid into the interior space 112. In some the aperture 140 may comprise drilled holes to dispense a drip, spray, stream, and/or trickle of fluid into the interior space 112.

In some examples, a second delivery loop 144 may form a second flow path for fluid into the second interior space 130. The second delivery loop 144 may couple to the main supply line 142, for instance, via an L-Fitting. The second delivery loop 144 may comprise any of the features or characteristics discussed above with regard to the first delivery loop 138. The first and second delivery loops 138 and 144 may be substantially similar or substantially different.

In some examples, a third enclosure may partially surround or otherwise communicatively couple to the second enclosure 114. A third flow path may convey fluid/s to the third enclosure using any of the delivery means described above with regard to the first and second enclosures 114. For instance a third delivery ring may be disposed in the third enclosure for conveying fluid/s into an interior space of the third enclosure. In some examples, the aeroponic system 100 may comprise a fourth enclosure, a fifth enclosure, or any number of enclosures enclosing each other or otherwise communicatively coupled together to partition the interior spaces of the cell 102.

In some embodiments, a fluid delivery 146 may be conveyed into the cell 102 via the fluid delivery system 120 according to a schedule log, as discussed in greater detail below. An excess fluid 148 (e.g., water) of the fluid delivery 146 may escape through a drainage system 150 and/or an excess fluid 152 (e.g., oxygen) may escape through the vent 136.

In some examples, components of the cell 102, such as the first enclosure 110 and/or the second enclosure 114 may have insulating properties. For instance, the first and second enclosures 110 and 114 may comprise a material, such as polymer, with low thermal conductivity so that a temperature within the cell 102 is maintained. As discussed in greater detail below, in some examples, a temperature within the cell 102 may be maintained between about 68° and about 72° Fahrenheit.

Illustrative Fluid Delivery System

Figure 2:
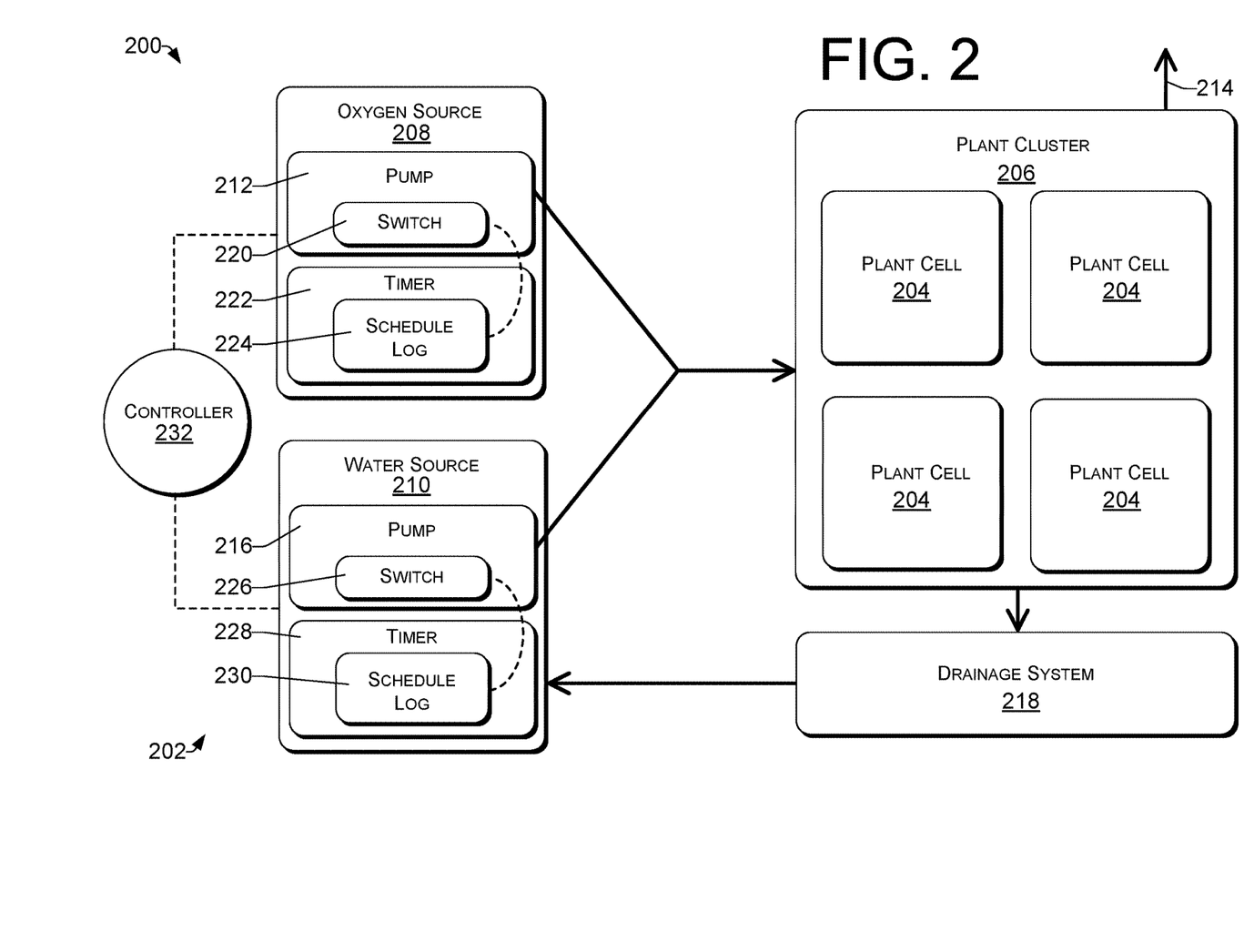
FIG. 2 illustrates an example aeroponic system comprising a fluid delivery system for distributing fluid/s to a plant or multiple plants.

FIG. 2 illustrates an example aeroponic system 200 comprising a fluid delivery system 202 for distributing a fluid or multiple fluids to a cell 204 or multiple cells of a cell cluster 206. The fluid delivery system 202 may comprise an oxygen source 208 and/or a water source 210.

In some examples, the oxygen source 208 may comprise a pump 212 for conveying oxygen from the oxygen source 208 into the cell 204. For instance, a plurality of interconnected components may form a flow path from the oxygen source 208 into the first enclosure of the cell 204. The plurality of interconnected components may comprise any type of tubing or plumbing components and/or hardware such as barbed, compression, yor-lok, flared, push-to-connect, quick-disconnect, and/or quick-turn tube fittings, flexible tubes or hoses (e.g., polyethylene, polyurethane, nylon, and/or vinyl), rigid tubes or hoses (e.g., metal, pvc, polycarbonate, acetal), angled, straight, elbow, and/or T-fittings, which, for example, can be purchased from McMaster-Carr Supply Company of Elmhurst, Ill.

In some examples, a second flow path may be formed by the plurality of interconnected components to convey oxygen from the oxygen source 208 into the second enclosure of the cell 204. Excess oxygen 214 may escape from the cell 204 and/or the cell cluster 206 via one or more vents.

In some embodiments, a pump 216 may be provided for conveying water from the water source 210 into the cell 204. For instance, the pump 216 may comprise a submersible fountain pump manufactured by Franklin Electric of Fort Wayne, Ind. In other examples, the pump 216 may comprise an external air-pressure pump, a line pump, or an injector pump. In some examples, the water may be conveyed into the first and/or second enclosures of the cell 204 using the same first and/or second flow paths used to convey oxygen from the oxygen source 208 into the cell 204. The fluid delivery system 202 may comprise a drainage system 218. For instance, each cell 204 of the cell cluster 206 may have a drainage hole in a bottom portion of the cell 204. The drainage hole of each cell 204 may be communicatively coupled together via multiple fittings and/or hoses, as discussed above. Gravity may direct excess water through the drainage holes into the drainage system 218, which may convey the excess water back to the water source 210. The drainage system 218 may comprise a filter or multiple filters. For example, a filter may be disposed in line with the drainage holes of each cell 204 in the cell cluster 206. The filter may remove any contaminations or particles unintentionally collected by the water as the water moves through the system so that the water may be reused. In some examples, the water source 210 and the fluid delivery system 202 including the drainage system 218 may comprise a cyclical water distribution flow, wherein the same water may be delivered, recollected, treated, and reused. The cyclical water distribution flow is discussed in greater detail below with regard to FIG. 4.

In some examples, the pumps 212 and 216 may convey their respective fluids into the fluid delivery system 202 via a plurality of interconnected delivery components. The pump 212 for conveying oxygen may comprise or couple to a switch 220 which toggles between an "on" and "off" position corresponding to the status of power provided to the pump 212. The switch 220 may have various intermediate positions for toggling varying amounts of power to the pump 212. In other examples, the switch 220 may be disposed remote from the pump 212. For instance, the switch 220 may comprise a valve in series with and downstream in the oxygen flow path from the pump 212.

In some embodiments, the switch 220 may communicatively couple (e.g., mechanically, fluidly, electrically, and/or via a wired or wireless data connection) to a timer 222. In some examples, the timer 222 may comprise a manually set timer, such as a iGS-011 Precision Cycle Timer manufactured by Nova Biomatique Inc. of La Pocatiére, Quebec, which may include the switch 220 within the same housing. The timer 222 may comprise a schedule log 224 which may store a predetermined or preset schedule for oxygen delivery. For instance, the schedule log 224 may determine periods of time during which oxygen may be conveyed to the cell 204 and periods of time during which oxygen is not conveyed. The schedule log 224 may be stored digitally or by analog/mechanical means.

In some examples, the pump 216 for conveying water to the cell 204 may comprise a switch 226. The switch 226 may comprise any of the characteristics or features or combinations thereof described above regarding the switch 220. For instance, the switch 226 may communicatively couple to a timer 228 with a schedule log 230. The switches 226 and 220 may comprise similar switches, different switches, or may, in fact, comprise a single switch disposed proximate or remote to the oxygen source 208 and/or the water source 210.

In some examples, a controller 232 may communicatively couple to the oxygen source 208 and/or the water source 210. The controller 232 may comprise an I/O control board in communication with a memory and/or processing unit. One or more of the schedule logs 224 and 230, the timers 222 and 228, the switches 220 and 226, and the pumps 212 and 216 may communicatively couple to the controller 232 in any combination and/or may reside in the memory of the controller 232. In other examples, the controller 232 may be omitted from the fluid delivery system 202. In that case, the schedule logs 224 and 230 may be provided by mechanical means, such as by the timers 222 and 228, and/or the switches 220 and 226 themselves.

In some examples, the fluid delivery system 202 may provide sustenance substances, such as oxygen and/or water, to a root system of the cell 204. In some instances, the fluid delivery system 202 may provide the sustenance substances to a plurality of plants, each having its own root system within its own cell. The plurality of plants may comprise the cell cluster 206. In some examples, a frame of the cell cluster may comprise a structure for positioning the plant cells in an array, row, column, stack, or any other arrangement for effective space allocation and/or use of gravity. In some examples, a configuration of the schedule logs 224 and 230 in conjunction with a configuration of the interconnected fluid delivery components may convey the sustenance substances to each cell at different times and/or in different amounts. In other examples, all plant of the cell cluster 206 may receive the sustenance substances from the fluid delivery system 202 at similar times and/or in similar amounts. In some examples, a fan system may be disposed proximate to the cell cluster 206 to provide a circulation of air, strengthening the plant stems and increasing their yield capabilities.

Figure 3:
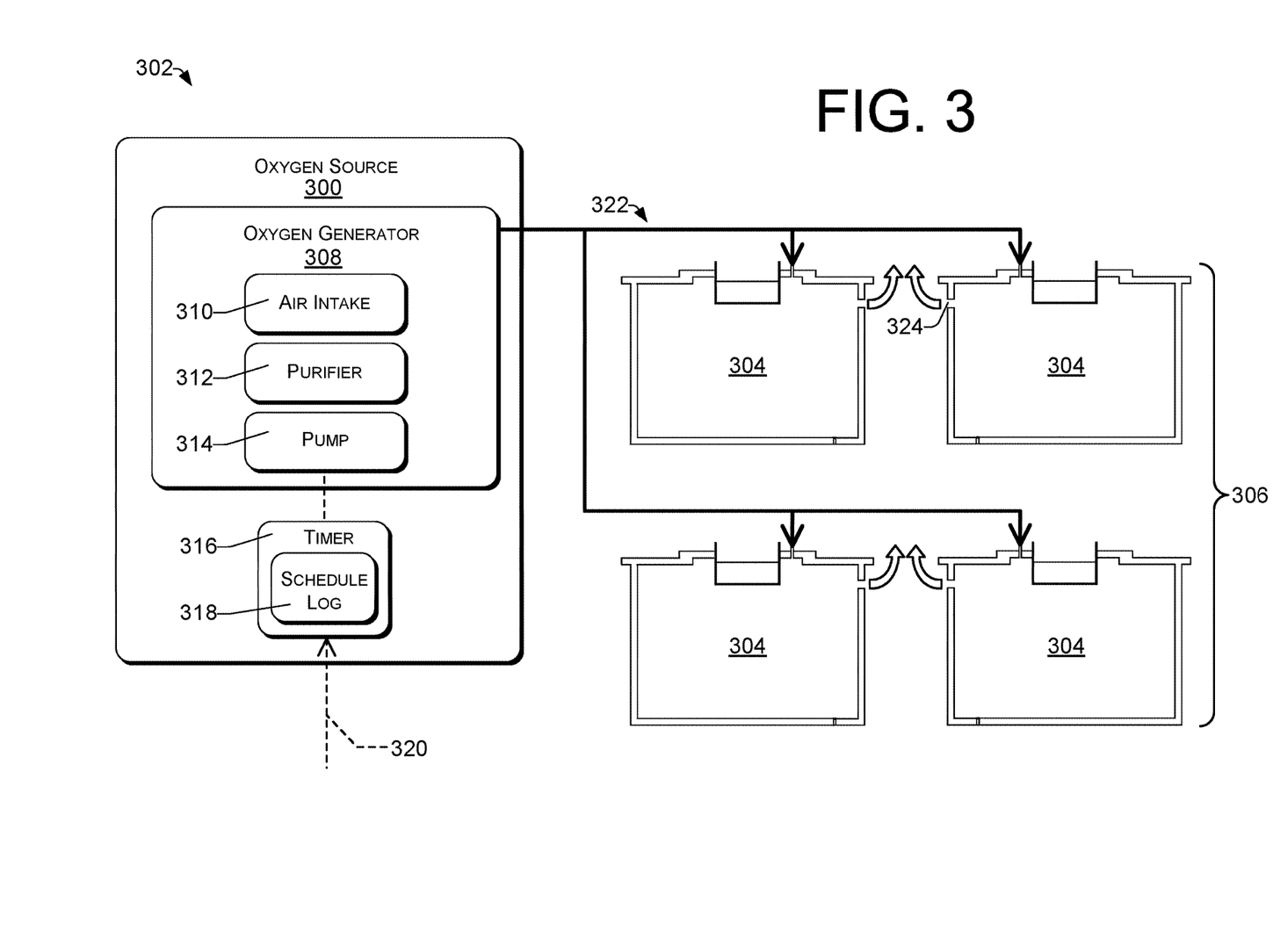
FIG. 3 illustrates an oxygen portion of the fluid delivery system shown in FIG. 2.

FIG. 3 illustrates an oxygen source 300 of a fluid delivery system 302 for conveying oxygen to a cell 304 or a plurality of plant cells of a cell cluster 306. The fluid delivery system 302 may comprise any of the characteristics or elements described above with regard to FIG. 2, but only the oxygen delivery portion of the fluid delivery system 302 is illustrated in FIG. 3. Alternatively, the fluid delivery system 302 may comprise solely the oxygen delivery portion.

In some embodiments, the oxygen source 300 may comprise a purified oxygen generator 308, such as s 5 liter Oxygen Concentrator with OSD manufactured by DeVilbiss Healthcare of Somerset, Pa. The oxygen generator 308 may comprise an air intake 310 for receiving air and a purifier 312 to extract purified oxygen gas from the received air. The oxygen generator 308 may comprise a pump 314 for conveying the purified oxygen gas into a main supply line 310 of the fluid delivery system 302. As described above with regard to FIG. 2, the pump 314 may be controlled by a timer 316 and/or a schedule log 318. In some examples the timer 316 and/or schedule log 318 may receive a controlling input 320 from a controller. In other examples, the timer 316 and/or the schedule log 318 may be set, adjusted, and/or controlled manually.

In some embodiments, the main supply line 310 may form a flow path for conveying purified oxygen 322 from the oxygen generator 308 into the cell 304 or the plurality of cells of the cell cluster 306. As shown in FIG. 1, the main supply line 310 may form a first flow path into a first enclosure of the cell 304 and a second flow path into a second enclosure of the cell 304. Upon activation of the pump 314, purified oxygen gas may travel through the main supply line 310 of the fluid delivery system 302 into the cell 304, filling the first and second enclosures of the cell 304. Excess or unconsumed purified oxygen 322 may exit the cell 304 or the plurality of cells 306 through one or more vents 324. In some examples, purified oxygen 322 may flow in both directions of the main supply line 310, such that water stored in the water source may receive supplemental oxygen.

Figure 4:
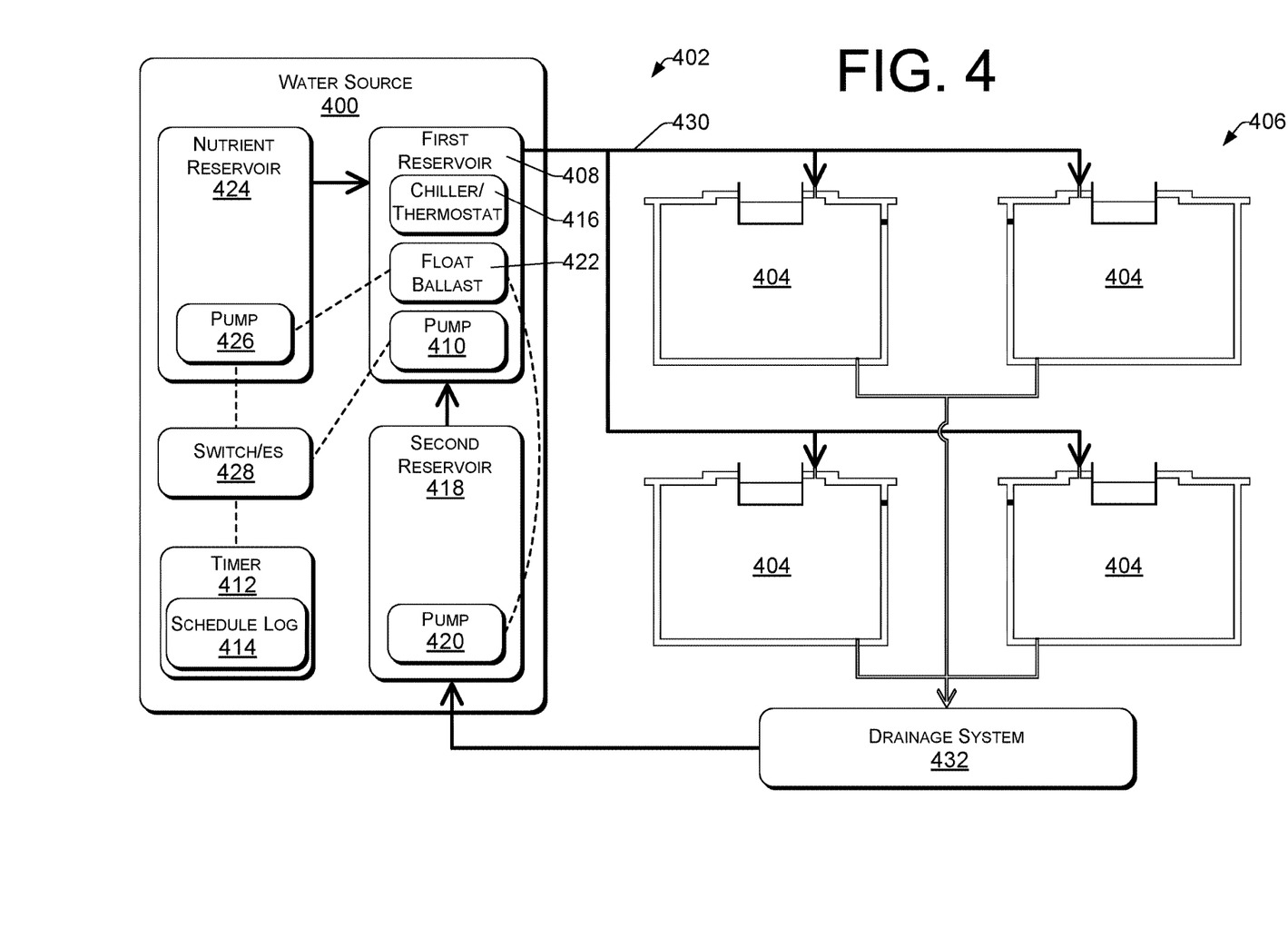
FIG. 4 illustrates a water portion of the fluid delivery system shown in FIG. 2.

FIG. 4 illustrates an example water source 400 of a fluid delivery system 402 for conveying water to a cell 404 or a plurality of plant cells of a cell cluster 406. The fluid delivery system 402 may comprise any of the characteristics or elements described above with regard to FIGS. 2 and 3, even though only the water delivery portion of the fluid delivery system 402 is illustrated in FIG. 4. Alternatively, the fluid delivery system 402 may comprise solely the water delivery portion.

In some embodiments, the water source 400 may comprise a first reservoir 408 for holding water, and a pump 410 for conveying the water from the first reservoir 408 to the cell 404 or the plurality of cells of the cell cluster 406. As discussed above, the pump 410 may comprise a submersible pump or an external pump, such as a pump attached to a side of the reservoir with a dip-tube for accessing the water, or a line pump. The pump 410 may convey water to the cell 404 or the cell cluster 406 according to a timer 412 and/or schedule log 414, as described above with regard to FIGS. 2 and 3.

In some examples, a chiller 416 communicatively coupled to a thermostat may be disposed in the first reservoir 408 for controlling a temperature of the water held in the first reservoir 408. For instance, the water may be kept at a temperature between about 68° and about 72° Fahrenheit by the chiller 416. In some examples, the temperature of the water may be kept at about 70° Fahrenheit by the chiller 416. In some embodiments, a thermostat or thermometer may be disposed in the cell 404, in which case the schedule log 414 may convey water at least partially responsive to an internal temperature of the cell 404.

In some examples, the water source 400 may comprise a second reservoir 418 communicatively coupled to the first reservoir 408. A pump 420 disposed in and/or communicatively coupled to the second reservoir 418 may convey water from the second reservoir 418 via a hose or tube to the first reservoir 408. The pump 420 may communicatively couple to a float ballast 422 disposed in the first reservoir 408. In some examples, the second reservoir 418 may be substantially similar to the first reservoir 408. In other examples, the second reservoir 418 may be substantially different than the first reservoir 408. For instance, the second reservoir 418 may comprise any water source, such as a spigot, a water line, a natural water feature (e.g., a lake, a stream, a river, a pond), or the like.

In some embodiments, the pump 420 may convey water from the second reservoir 418 into the first reservoir 408 when the float ballast 422 reaches or falls below a predetermined level. The second reservoir 418 may replenish the first reservoir 408 to maintain a certain volume of water in the first reservoir 408. For instance, the replenishing of water may maintain a selected pH of the water in the first reservoir 408.

In some examples, nutrients may be added to the water in the first reservoir 408 and/or the second reservoir 418. Nutrients may be added manually or, as illustrated in FIG. 4, may be conveyed from a nutrient reservoir 424 via a pump 426. The nutrients may comprise any combination of potassium, nitrogen, phosphorus, iron, vitamin B, and/or other substances that promote plant growth. In some examples, the amounts and/or ratios of nutrients may be based at least partially on a type of the plant and/or a growth stage the plant is in when receiving the nutrients. The nutrient reservoir 424 may contain a solution of nutrients dissolved in water and may convey the nutrients into the first reservoir responsive to the level of the float ballast 422 and/or a switch 428 communicatively coupled to the timer 412 and/or the schedule log 414.

In some embodiments, water may be conveyed from the water source 400 into a first enclosure and/or second enclosure of the cell 404 or the cell cluster 406 via a main supply line 430. The main supply line 430 may be the same line used for conveying oxygen to the cell 404 or the cell cluster 406. In some examples, excess water may exit each cell of the cell cluster 406 via a drainage system 432, as discussed above with regard to FIG. 2. In some examples, a bottom surface of the cell 404 may comprise a slant to guide water, under the force of gravity, towards a drainage hole. Drainage holes of each cell of the cell cluster 406 may be interconnected. In some examples, gravity may direct the excess water into the first reservoir 408 and/or the second reservoir 418, creating a cyclical flow of water through the fluid delivery system 402. In other examples, a pump may convey the excess water from the drainage system 432 to the water source 400.

Figure 5:
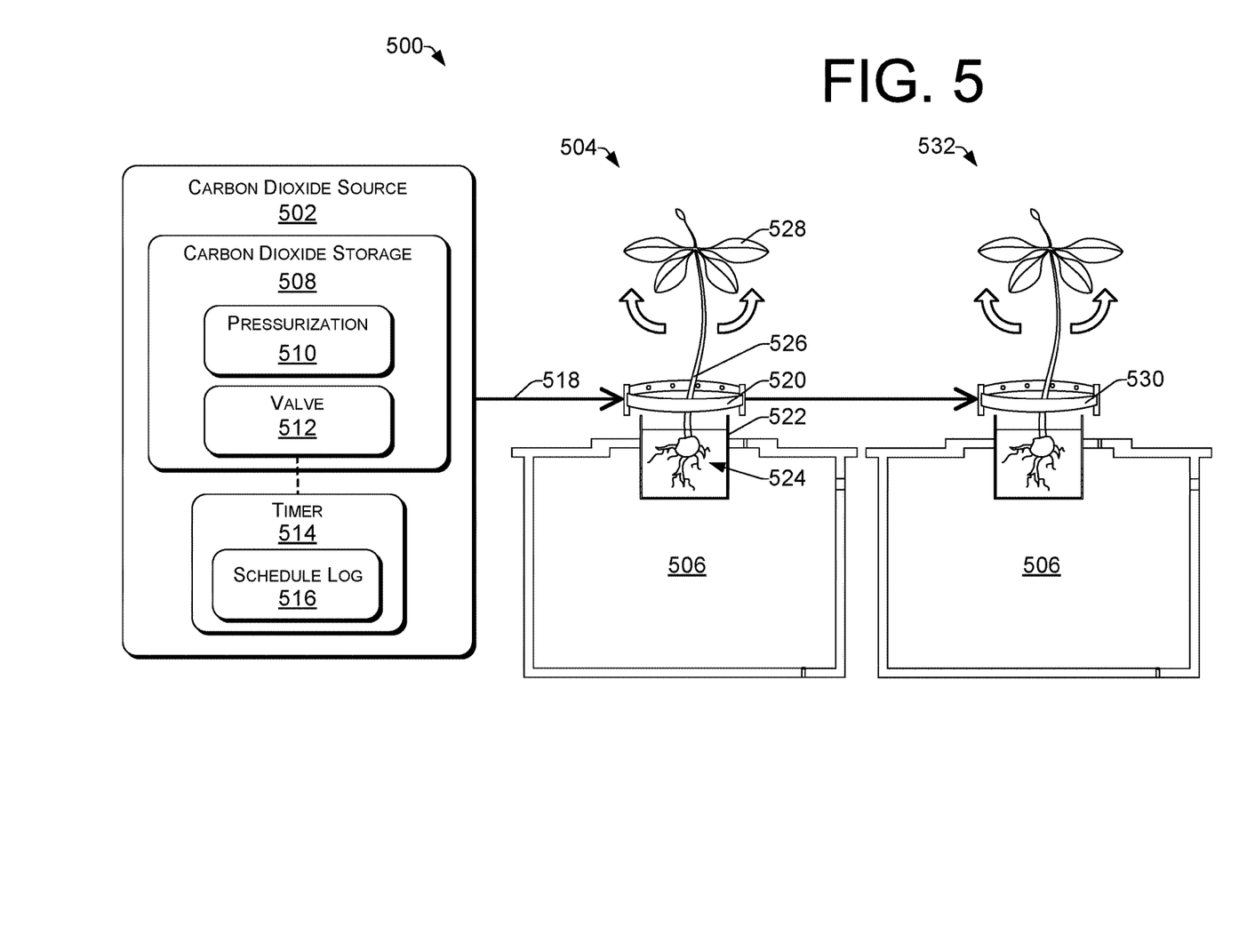
FIG. 5 illustrates an example aeroponic system comprising a carbon dioxide delivery system.

FIG. 5 illustrates an example fluid delivery system 500 comprising a carbon dioxide source 502 for providing carbon dioxide to a plant 504 of a plant cell 506 or multiple plants of a cell cluster. The fluid delivery system 500 may also comprise an oxygen source and/or a water source, as discussed above. Alternatively, the carbon dioxide source 502 may comprise the only fluid source of the fluid delivery system 500.

In some embodiments, the carbon dioxide source 502 may comprise a carbon dioxide storage tank 508 with an internal pressurization 510. A valve 512 may couple to the storage tank 508 to release carbon dioxide when the valve 512 is in an open position. In some examples, the valve 512 may communicatively couple to a timer 514 and/or a schedule log 516 that controls the position of the valve 512. Carbon dioxide may be expelled by the pressurization 510 into a carbon dioxide delivery line 518 when the valve 512 is in the open position. In other examples the carbon dioxide source 502 may comprise a carbon dioxide generator, such as a propane burner.

In some examples, the delivery line 518 and associated components for connecting to the carbon dioxide source 502 and dispensing carbon dioxide may comprise any of the aforementioned plurality of fluid delivery components. In some embodiments, a carbon dioxide delivery loop 520 may be disposed in series with the delivery line 518 and/or may receive carbon dioxide from the delivery line 518. The delivery loop 520 may be disposed on, above, and/or proximate to a receptacle 522 for holding a base 524 (e.g., roots) of the plant 504. For instance, the delivery loop 520 may encircle a lower portion of a stem 526 of the plant 504. In some embodiments, the delivery loop 520 may comprise a ring, rectangle, square, or triangle shape. In other embodiments, the delivery loop 520 may merely comprise a linear length of tube.

In some embodiments, the carbon dioxide delivery loop 520 may comprise hose or tubing, as discussed above. An aperture 522 or a plurality of apertures may be disposed on the delivery loop 520 for releasing carbon dioxide from the delivery loop 520 around the plant 504. For instance, carbon dioxide may be released from the delivery loop 520 into the air surrounding the plant 504, the stem 526 (e.g., a lower portion of the stem 526), and/or the base 524. Carbon dioxide released from the delivery loop 520 may be consumed by the plant 504, including a leaf or plurality of leaves 528 which may absorb some of the carbon dioxide through stomata. In some examples, misters, valves, nozzles, and/or other mechanisms may be disposed on the delivery loop 520 to assist in dispensing carbon dioxide.

In some examples, the carbon dioxide delivery loop 520 may supply carbon dioxide to the plant 504. As shown in FIG. 5, a second carbon dioxide delivery loop 530 may supply carbon dioxide to a second plant 532. The second delivery loop 530 may be connected to the first delivery loop 520 via any combination of interconnected delivery components. Although two delivery loops 520 and 530 for supplying carbon dioxide to two plants 504 and 532 are shown in FIG. 5, any number of delivery loops may be used to supply carbon dioxide to any number of plants. For instance, four delivery loops may supply carbon dioxide to four plants in the manner described above. In some examples, each plant of a cell cluster may have a corresponding delivery loop 520 disposed around its base. Each delivery loop 520 may supply carbon dioxide to each plant from the carbon dioxide source 502. In some examples, each individual plant of a cell cluster may be provided its own localized distribution of carbon dioxide from each of the delivery loops 520. In this way, health hazards of carbon dioxide exposure (e.g., dizziness, disorientation, asphyxiation, depression of the central nervous system) can be avoided.

Figure 6:
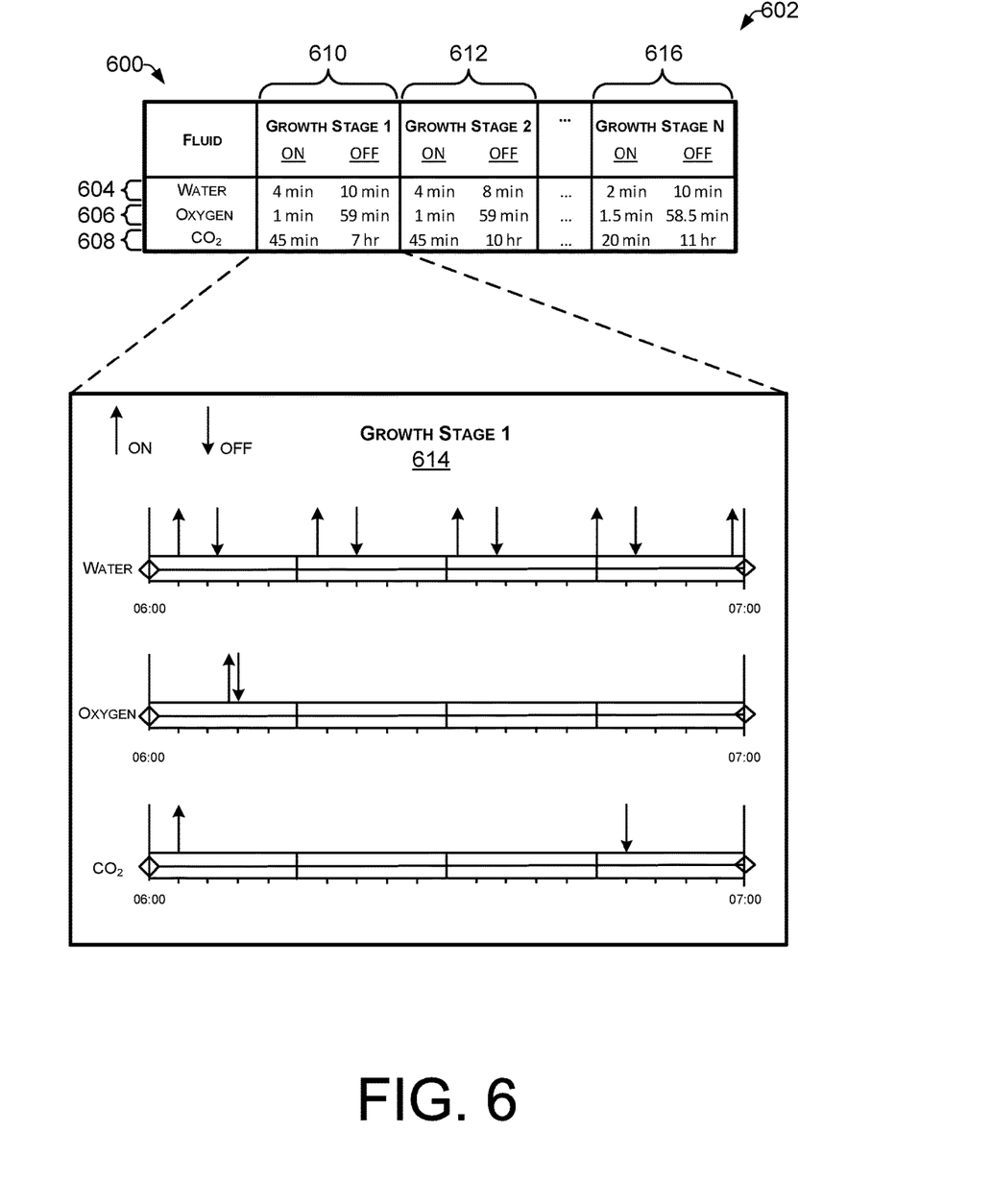
FIG. 6 illustrates an example schedule log of the fluid delivery systems shown in FIGS. 2-5.

FIG. 6 illustrates an example schedule log 600 for a fluid delivery system 602. The schedule log 600 may comprise information, data, and/or actions that determine or control the times and/or durations during which a fluid, such as water, oxygen, and/or carbon dioxide is conveyed from a fluid source to a plant cell or a cell cluster. For instance, the schedule log 600 may determine the times and/or durations that any of the aforementioned pumps are supplied power and/or valves are opened so fluid may be conveyed through the main supply line.

In some examples, the schedule log 600 may comprise data stored in a memory for controlling the pumps of the fluid sources when processed by a processing unit. In some examples, the schedule log 600 may comprise a user manually setting a timer or multiple timers in communication with a switch or multiple switches. In some examples, the schedule log 600 may comprise any combination of manual, analog, mechanical settings and/or digital/data settings that determine the times and/or durations of fluid delivery from a fluid source or a plurality of fluid sources to a plant cell or a plant cell cluster.

In some examples, the schedule log 600 may comprise a single fluid delivery schedule or multiple fluid delivery schedules. For instance, the schedule log 600 may comprise a water delivery schedule 604, an oxygen delivery schedule 606, and/or a carbon dioxide delivery schedule 608. Each fluid delivery schedule 604, 606, and 608 may comprise "on" and "off" duration information for a first growth stage 610 of a plant associated with the schedule log 602. The "on" and "off" duration information may comprise a number of seconds, minutes, hours, and/or days during which a pump for the fluid source associated with the delivery schedule is active and inactive. The "on" and "off" duration information may indicate when and/or for how long fluid is provided from a fluid source to a plant cell. Additionally or alternatively, the delivery schedules 604, 606, and/or 608 may define a specific quantity of each fluid to dispense.

In some examples, "on" and "off" duration information for a second growth stage 612 may also be included in the schedule log 600. In fact, any number of N growth stages may be represented by "on" and "off" duration information. For instance, the number and types of growth stages in the schedule log 600 may correspond to the number and types of growth stages of the plant being supplied fluid/s. For instance, different types of plants may have different growth stages for different durations. By way of example and not limitation, the growth stages of the plant may comprise a germination stage, a seedling stage, an early vegetative stage, a middle vegetative stage, a late vegetative stage, an early flowering stage, a middle flowering stage, a late flowering stage, a harvesting stage, and/or combinations thereof.

In some examples, the schedule log 600 may comprise the first growth stage 610, which may be an early vegetative stage. The schedule log 600 may comprise the water delivery schedule 604 which, during the first growth stage 610, may comprise about four minutes of water delivery on, followed by about 10 minutes of water delivery off. The "on" and "off" durations of the schedule log 600 may repeat for any number of days, weeks, and/or months until the associated growth stage is over or a subsequent growth stage has been entered by the plant.

In some embodiments, the schedule log 600 may comprise the water delivery schedule 604 which, during the first growth stage 610, may comprise about one minute to about fifteen minutes of water delivery on, followed by about one minute to about fifteen minutes of water delivery off. However, the first growth stage 610 may comprise another water delivery schedule with other amounts of time on or off depending, at least in part, on a type and/or age of the plant being provided water.

In some examples, the schedule log 600 may comprise the oxygen delivery schedule 606 which, during the first growth stage 610, may comprise about one minute of oxygen delivery on, followed by about 59 minutes of oxygen delivery off. In some examples, the oxygen delivery schedule 606 may comprise about 30 seconds to about two minutes of oxygen delivery on, followed by about 30 minutes to about three hours of oxygen delivery off. However, the first growth stage 610 may comprise another oxygen delivery schedule with other amounts of time on or off depending, at least in part, on a type and/or age of the plant being provided oxygen.

In some embodiments, the schedule log 600 may comprise the carbon dioxide delivery schedule 608 which, during the first growth stage 610, may comprise about 45 minutes of carbon dioxide delivery on, followed by about seven hours of carbon dioxide delivery off. In some examples, the carbon dioxide delivery schedule 608 may comprise about 15 minutes to about an hour of carbon dioxide delivery on, followed by about four hours to about 24 hours of carbon dioxide delivery off. However, the first growth stage 610 may comprise another carbon dioxide delivery schedule with other amounts of time on or off depending, at least in part, on a type and/or age of the plant being provided carbon dioxide.

FIG. 6 further illustrates an interval 614 of the first growth stage 610. The interval 614 may comprise an example interval of one hour of fluid delivery according to the schedule log 600. In some examples, the oxygen delivery schedule 606 may convey oxygen once during the interval 614. In some examples, the oxygen delivery schedule 606 may convey oxygen during a period of the interval 614 in between deliveries of water, or during an "off" period of water delivery. In some examples, the carbon dioxide delivery schedule 608 may convey carbon dioxide during a same period of the interval 614 that water and/or oxygen is being conveyed. For instance, carbon dioxide may be conveyed to an upper portion of the plant at a same time that water and/or oxygen is conveyed to a root portion of the plant.

As illustrated in FIG. 6, the schedule log 600 may comprise the second growth stage 612, which, for instance, may comprise a late vegetative stage. In the second growth stage 612, the "on" and "off" duration information of the water delivery schedule 604, the oxygen delivery schedule 606, and/or the carbon dioxide delivery schedule 608 may be substantially the same or substantially different than the "on" and "off" duration information of the first growth stage 610.

In some examples, the schedule log 600 may comprise an Nth growth stage 616, which, for instance, may comprise a final growth stage and/or a flowering stage of the plant. In some examples, the schedule log 600 may comprise the water delivery schedule 604 which, during the Nth growth stage 616, may comprise about two minutes of water delivery on, followed by about 10 minutes of water delivery off. In some examples, the water delivery schedule 606 may about one minute to about three minutes of water delivery on, followed by about 5 minutes to about 20 minutes of water delivery off. However, the Nth growth stage 616 may comprise another water delivery schedule with other amounts of time on or off depending, at least in part, on a type and/or age of the plant being provided water.

In some examples, the schedule log 600 may comprise the oxygen delivery schedule 606 which, during the Nth growth stage 616, may comprise about 90 seconds of oxygen delivery on, followed by about 58.5 minutes of oxygen delivery off. In some examples, the oxygen delivery schedule 606 may comprise about one minute to about three minutes of oxygen delivery on, followed by about 30 minutes to about two hours of oxygen delivery off. However, the Nth growth stage 616 may comprise another oxygen delivery schedule with other amounts of time on or off depending, at least in part, on a type and/or age of the plant being provided oxygen.

In some embodiments, the schedule log 600 may comprise the carbon dioxide delivery schedule 608 which, during the Nth growth stage 616, may comprise about 20 minutes of carbon dioxide delivery on, followed by about 11 hours of carbon dioxide delivery off. In some examples, the carbon dioxide delivery schedule 608 may comprise about 5 minutes to about an hour of carbon dioxide delivery on, followed by about two hours to about 24 hours of carbon dioxide delivery off. However, the Nth growth stage 616 may comprise another carbon dioxide delivery schedule with other amounts of time on or off depending, at least in part, on a type and/or age of the plant being provided carbon dioxide.

As discussed above, in some examples, the schedule log 600 may comprise any number of growth stages, which may correspond to a type or age of the plant being provided fluids. The "on" and "off" duration information of each delivery schedule (e.g., water, oxygen, and carbon dioxide) for each growth stage may correspond to an optimal amount of the fluid consumable by the plant. For instance, a plant may only be able to consume a limited amount of water during an early vegetative stage. Accordingly, the schedule log may provide this amount of water during the early vegetative stage. The plant may be able to consume a different, greater amount of water during a late vegetative stage. Accordingly, the schedule log may provide a different amount of water during the late vegetative stage. In some embodiments, an amount of a fluid (e.g., water, oxygen, or carbon dioxide) may be provided to the plant according to the plant's optimum fluid intake. The delivery schedules of the schedule log may correspond to an optimum fluid intake specific to the type of plant and/or the growth stage/s of the plant. In some examples, more oxygen may be provided in later growth stages than in earlier growth stages.

In some examples, the schedule log 600 may determine an amount of fluid/s (e.g., water, oxygen, and/or carbon dioxide) conveyed to the plant according to "on" and "off" duration information associated with a fluid source corresponding to each fluid. In other examples, the schedule log 600 may instead indicate an actual quantity of the fluid/s to be provided. For instance, the schedule log 600 may indicate that half a gallon of water is to be conveyed to the plant during the interval 614. In some examples, the difference between "on" and "off" duration information and actual quantity information may merely be a matter of conversion based on a pump rate. For instance, the pump for conveying water from the water source may comprise a pump rate of 10 gallons/minute. In this instance, 4 minutes of water delivery "on" corresponds to an actual quantity of 40 gallons delivered.

In some examples, the plant cell may have a drainage system and/or a vent for allowing excess fluid/s to escape. Because excess fluid/s may escape, it may be suitable to convey fluids according to "on" and "off" duration information rather than an actual quantity of fluid, even though the "on" and "off" duration information may be easily converted into the actual quantity of fluid provided.

Figure 7:
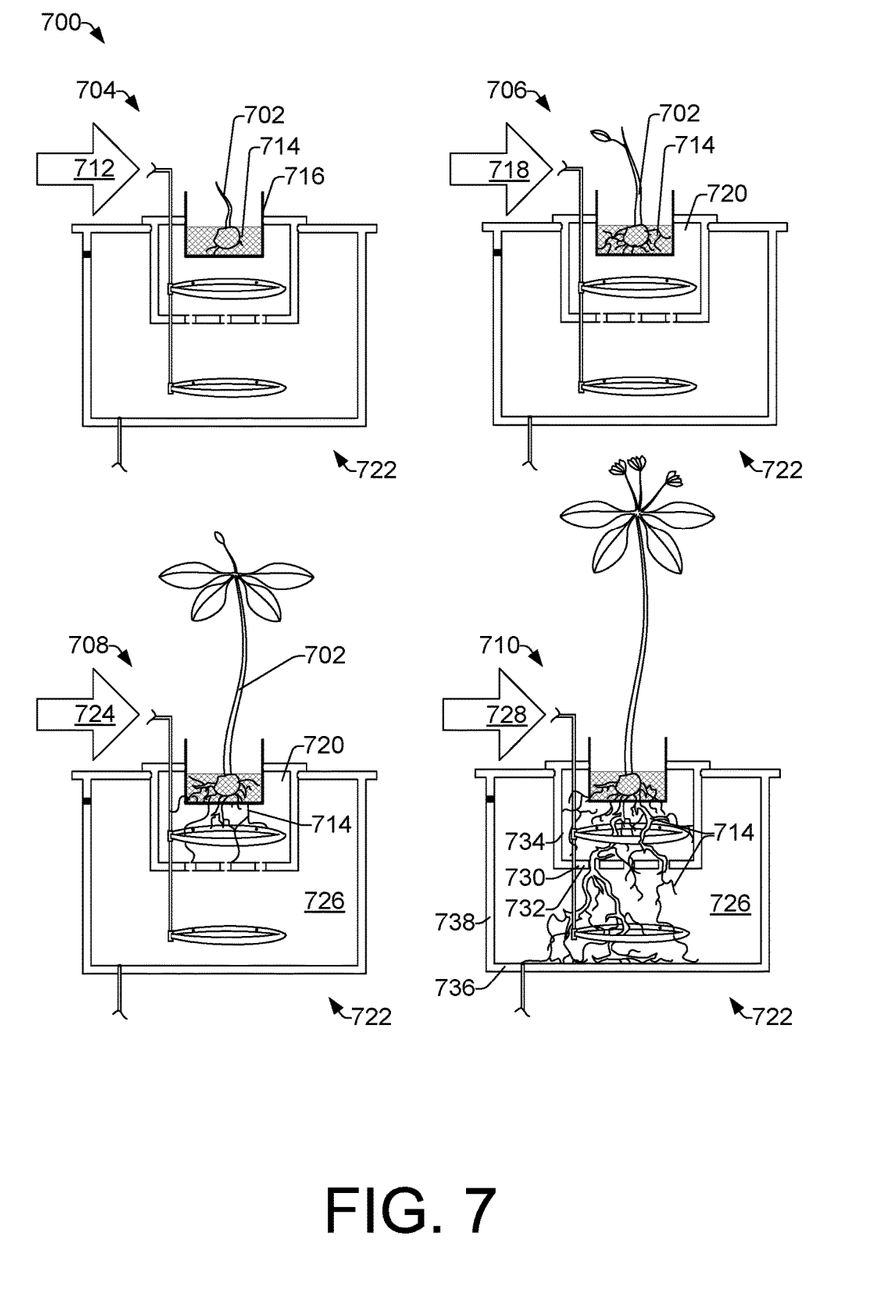
FIG. 7 illustrates an example aeroponic system in multiple growth stages.

FIG. 7 illustrates an aeroponic system 700 in multiple growth stages. The multiple growth stages may comprise a plant 702 in a seedling stage 704, a vegetative stage 706, an early flowering stage 708 and a late flowering stage 710.

In some examples, a fluid delivery 712 may be provided to the plant 702 when the plant 702 is in the seedling stage 704. The fluid delivery 712 may provide water, nutrients, and/or oxygen to a root structure 714 of the plant 702. In some examples, the water, nutrients, and/or oxygen may be provided in optimal amounts for consumption by the plant 702. In some examples, the optimal fluid amounts may be specific to a type of the plant 702 and/or a growth stage of the plant 702. The optimal fluid amounts may comprise a maximum amount of a fluid consumable by the plant 702 that does not increase a vulnerability of the plant 702 to diseases, such as *pythium*.

In some embodiments, the root structure 714 of the plant 702 may be retained by a perforated receptacle 716. In some examples, the root structure 714 may be entirely contained in the perforated receptacle 716 during the seedling stage 704.

In some examples, a fluid delivery 718 may be provided to the plant 702 when the plant 702 is in the vegetative stage 706. The fluid delivery 718 may provide water, nutrients, and/or oxygen during the vegetative stage 706 in amounts different than the fluid delivery 712 provided during the seedling stage 704. In some examples, the optimal fluid consumption amounts of the plant 702 may be different during the vegetative stage 706 than in the seedling stage 704. For instance, the plant 702 may be capable of consuming more water in the vegetative stage 706 than in the seedling stage 704 without increasing the vulnerability of the plant to disease. Accordingly, the fluid delivery 718 may provide more water during the vegetative stage 706 than the fluid delivery 712 during the seedling stage 704. In other examples, the fluid deliveries 718 and 712 may provide substantially the same amounts of fluids to the plant 702.

In some embodiments, the root structure 714 of the plant 702 may be entirely contained in the perforated receptacle 716 during the vegetative stage 706. In other examples, the root structure 714 may enter a first root chamber 720 of a plant cell 722 in the vegetative stage 706.

In some examples, a fluid delivery 724 may be provided to the plant 702 when the plant 702 is in the early flowering stage 708. The fluid delivery 724 may provide water, nutrients, and/or oxygen during the early flowering stage 708 in amounts different than the fluid deliveries 712 and/or 718 provided during the seedling stage 704 and/or the vegetative stage 706, respectively. In some embodiments, the optimal fluid consumption amounts of the plant 702 during the early flowering stage 708 may be specific to the type of plant 702 and/or an age of the plant 702. For instance, a plant may be capable of consuming more oxygen during the early flowering stage 708 than during the vegetative stage 706. Accordingly, the fluid delivery 724 may provide more oxygen during the early flowering stage 708 than the fluid delivery 718 provides during the vegetative stage 706.

In some embodiments, the root structure 714 of the plant 702 may be at least partially disposed in the first root chamber 720 of the cell 722 when the plant 702 is in the early flowering stage 708. In some examples, the root structure 714 may enter the first root chamber 720 when the plant 702 transitions from the vegetative stage 706 to the early flowering stage 708. In some instances, the root structure 714 may be at least partially disposed in both the first root chamber 720 and a second root chamber 726 of the cell 722 when the plant 702 is in the early flowering stage 708.

In some examples, a fluid delivery 728 may be provided to the plant 702 when the plant 702 is in the late flowering stage 710. The fluid delivery 728 may provide water, nutrients, and/or oxygen during the late flowering stage 710 in amounts different than any of the previously discussed fluid deliveries 712, 718, and/or 724, or in amounts similar to any of the previously discussed fluid deliveries 712, 718, and/or 724. The fluid delivery 728 during the late flowering stage 710 may provide optimal amounts of water, nutrients, and/or oxygen for consumption by the plant 702. In some instances, the late flowering stage 710 or the early flowering stage 708 may comprise fluid deliveries 728 or 724 that provide more oxygen to the plant 702 than fluid deliveries during other growth stages.

In some embodiments, the root structure 714 of the plant 702 may be at least partially disposed in the first root chamber 720 and the second root chamber 726 of the cell 722 when the plant 704 is in the late flowering stage 710. In some examples, the root structure 714 may at least partially fill an interior space of the first root chamber 720 and/or the second root chamber 726 when the plant 702 is in the early flowering stage 708 or the late flowering stage 710. For instance, when flowering, the root structure 714 may pass through a divider 730 between the first root chamber 720 and the second root chamber 724. In some examples, during flowering, the root structure 714 of the plant 702 may at least partially fill the interior space such that it abuts a bottom wall 732 of the first root chamber 720, a side wall 734 of the first root chamber 720, a bottom wall 736 of the second root chamber 726, and/or a side wall 738 of the second root chamber 726.

Although the multiple growth stages are illustrated in FIG. 7 as four discrete stages, any number of growth stages may be omitted, added, and/or combined. For instance, the early flowering stage 708 and the late flowering stage 710 may be considered a single flowering stage. Further, any number of growth stages may have intermediate, transitional, or overlapping stages.

Illustrative Aeroponic Fluid Delivery Method

Figure 8:
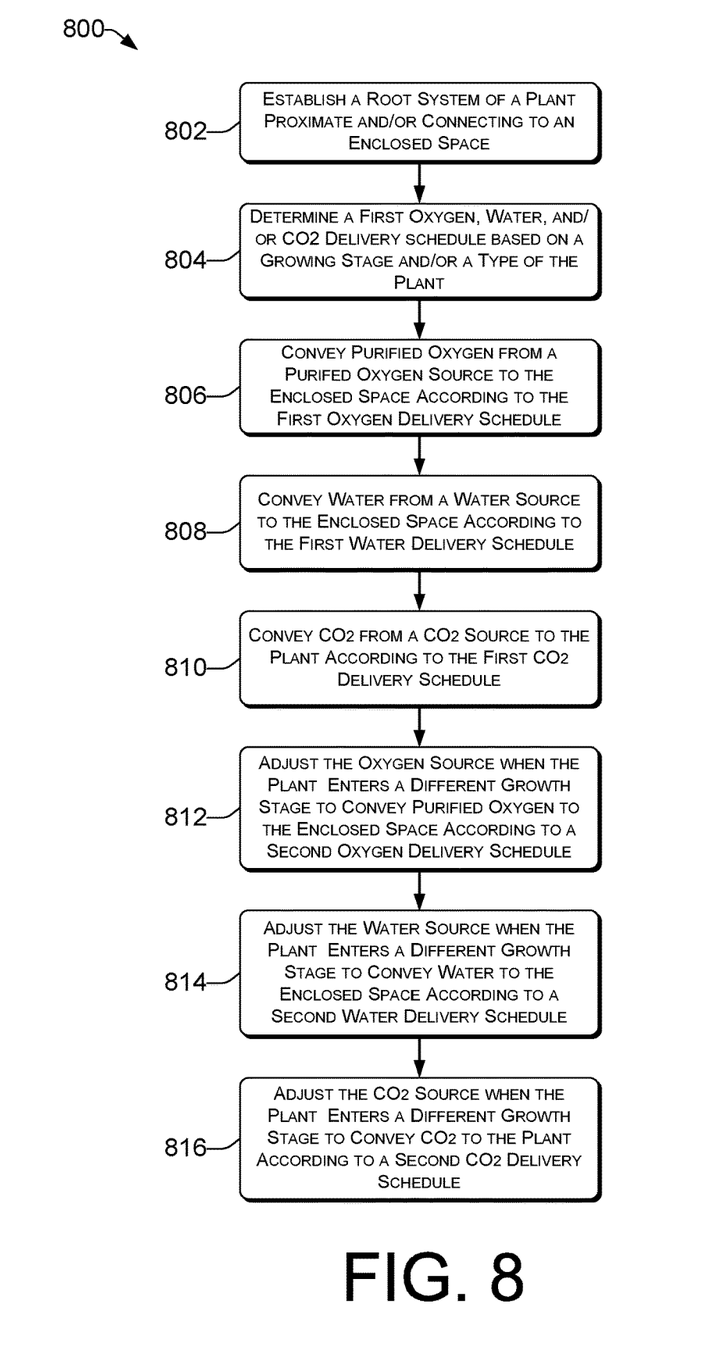
FIG. 8 illustrates an example aeroponic method for increasing a yield of a plant.

FIG. 8 is a flow diagram illustrating an example method 800 for increasing a yield of a plant with an aeroponic system. For convenience, the method 800 will be described with reference to the aeroponic system as illustrated in FIGS. 1-7, but the method 800 is not limited to use with this system. While FIG. 8 illustrates an example order, in some instances, the described operations in this and all other methods described herein may be performed in other orders and/or in parallel. Further, some operations of the method 800 may be omitted, repeated, and/or combined.

In some examples, the method 800 may begin at operation 802, where a root system of a plant is established proximate to and/or connecting to an enclosed space. The establishing may comprise a germination process of a seed in a growing medium, such as soil, rocks, plastic beads, glass marbles, hygroten, foam, and/or rockwool. In some examples, the growing medium may be proximate to and/or connected to the enclosed space prior to the germination process. In other examples, the seed may be germinated distal from the enclosed space, then relocated proximate to and/or connected to the enclosed space. For instance, the establishing may comprise positioning and/or securing a root system proximate to and/or connected to the enclosed space.

In some embodiments, the method 800 may include operation 804, where a first oxygen, water, and/or carbon dioxide delivery schedule is determined based on a growing stage and/or a type of the plant. For instance, the delivery schedules may be configured to provide an optimal amount of fluid (e.g., water, oxygen, and/or carbon dioxide) to the plant based on how much of that fluid the plant can consume at the growth stage of the plant without increasing a vulnerability to disease (e.g., root rot). The oxygen, water, and/or carbon dioxide delivery schedules may be stored in a schedule log and/or in mechanical means, such as a combination of timers and switches. Each fluid delivery schedule may communicatively couple to its corresponding fluid source and/or the delivery means (e.g., pumps, valves, interconnected delivery components, etc.) of each fluid source.

In some examples, the method 800 may include operation 806, where purified oxygen is conveyed from a purified oxygen source into the enclosed space according to the first oxygen delivery schedule. For instance, the oxygen source may comprise a purified oxygen generator coupled to a switch. In some examples, the first oxygen delivery schedule may comprise a timer setting controllably connected to the switch, executable instructions stored in a memory, or combinations thereof. The purified oxygen may comprise a gas having an oxygen percentage substantially greater than the oxygen percentage of air. For instance the purified oxygen may comprise a gas having about 30% oxygen, about 40% oxygen, about 50% oxygen, about 60% oxygen, about 70% oxygen, about 80% oxygen, about 90% oxygen, about 95% oxygen, about 98% oxygen, about 99% oxygen, a percentage of oxygen between any of the aforementioned percentages, or any other percentage of oxygen greater than the percentage of oxygen present in air. In some examples, the purified oxygen may comprise air with a greater oxygen percentage than the air within the enclosed space. For instance, oxygen may be consumed by the roots of the plant, depleting the oxygen of the air in the enclosed space. Providing external air into the enclosed space would, in this instance, increase the purity of oxygen of the air in the enclosed space.

In some embodiments, the method 800 may include operation 808, where water is conveyed from a water source to the enclosed space according to the first water delivery schedule. For instance, the water source may comprise a single water reservoir or multiple water reservoirs communicatively coupled together. The water delivery schedule may convey water to the enclosed space using the same main supply line that conveys the oxygen. In some examples, the water delivery schedule may alternate with the oxygen delivery schedule such that only oxygen or water is conveyed at any particular point in time. In some examples, water and oxygen may be conveyed at a same time. In some embodiments, the water may comprise a nutrient solution.

In some examples, the method 800 may include operation 810, where carbon dioxide is conveyed from a carbon dioxide source to the plant. The carbon dioxide source may comprise a pressurized storage tank or a carbon dioxide generator, such as a propane burner. In some embodiments, carbon dioxide may be conveyed to the plant with a carbon dioxide delivery loop positioned around a base or a stem of the plant. The carbon dioxide delivery loop may comprise a ring of tubing for distributing carbon dioxide to an individual plant. Multiple carbon dioxide delivery loops may convey carbon dioxide to multiple plants, each positioned around a base of a plant. In some examples, the carbon dioxide delivery loop may increase the concentration of carbon dioxide in the air immediately proximate to the plant.

In some embodiments, the method 800 may include operation 812, where the oxygen source is adjusted to convey purified oxygen according to a second oxygen delivery schedule when the plant enters a different growth stage. The adjustment may be made automatically, for instance, by a processor coupled to a schedule log, or the adjustment may be made manually, for instance, by adjusting the settings on a mechanical timer. The different growth stage may comprise any of the aforementioned growth stages. For instance, the oxygen source may be adjusted to increase the amount of purified oxygen conveyed to the plant when the plant enters a flowering stage.

In some examples, the method 800 may include operation 814, where the water source is adjusted to convey water according to a second water delivery schedule when the plant enters a different growth stage. The different growth stage may be the same growth stage entered by the plant in operation 812, or it may be distinct from the growth stage entered in operation 812. Like operation 812, the adjustment in operation 814 may be made automatically or manually. In some examples, the adjustment may comprise a change in an amount of water conveyed, a change in the nutrients added to the water conveyed, a change in the pH of the water conveyed, a change in the temperature of the water conveyed, and/or combinations thereof.

In some examples, the method 800 may include operation 816, where the carbon dioxide source is adjusted to convey carbon dioxide to the plant according to a second carbon dioxide delivery schedule when the plant enters a different growth stage. The different growth stage may be the same stage entered by the plant in operations 812 or 814 or the different growth stage may be distinct from the growth stage entered in operations 812 or 814. The adjustment may be made manually or automatically. In some examples, the second carbon dioxide delivery schedule may reduce an amount of carbon dioxide conveyed when the plant enters a flowering stage.

CONCLUSION

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:

1. A multi-chamber root propagation system comprising:
   a permeable receptacle with a top opening for receiving a base of a plant;
   a first enclosure disposed below the permeable receptacle and at least partially surrounding the permeable receptacle, the first enclosure being devoid of plant medium;
   a second enclosure at least partially encasing the first enclosure, a bottom portion of the first enclosure comprising a perforated divider having a root passage through perforations of the perforated divider between the first enclosure and the second enclosure, the second enclosure being devoid of plant medium; and
   a fluid delivery system comprising:
      a vertical supply line extending from a top of the first enclosure into a first interior space enclosed by the first enclosure, a first flow path extending from the vertical supply line toward a center of the first interior space, the vertical supply line extending vertically from the first interior space into a second interior space enclosed by the second enclosure, a second flow path extending from the vertical supply line toward a center of the second interior space;
      the first flow path comprising a first delivery loop with one or more apertures conveying a fluid from a fluid source, communicatively coupled to the vertical supply line, into the first interior space enclosed by the first enclosure, the first delivery loop being positioned above the root passage;
      the second flow path comprising a second delivery loop with one or more apertures conveying the fluid from the fluid source into the second interior space enclosed by the second enclosure, the second delivery loop being positioned below the root passage;
      a vent opening disposed on an outer wall of the second enclosure; and
      a drainage opening disposed at a bottom portion of the second enclosure;
   a timer set to control a first schedule for delivering water into the fluid delivery system and to control a second schedule for delivering purified oxygen gas into the fluid delivery system, the first schedule not overlapping with the second schedule;
   a water source communicatively coupled to the fluid delivery system and the timer; and
   a purified oxygen generator communicatively coupled to the fluid delivery system and the timer.

2. The multi-chamber root propagation system of claim 1, further comprising a pump coupled to the water source, the pump conveying water from the water source into the vertical supply line.

3. The multi-chamber root propagation system of claim 1, further comprising a pump coupled to the purified oxygen generator, the pump conveying oxygen gas into the fluid delivery system.

4. The multi-chamber root propagation system of claim 1, wherein the water comprises a nutrient solution.

5. The multi-chamber root propagation system of claim 1, further comprising a chiller and a thermostat communicatively coupled to the water source to maintain the water temperature within a selected range.

6. The multi-chamber root propagation system of claim 1, further comprising a carbon dioxide delivery component coupled to a carbon dioxide source in or proximate to the receptacle to deliver carbon dioxide to the base of the plant.

7. The multi-chamber root propagation system of claim 1, wherein water and purified oxygen gas are conveyed into the fluid delivery system via a pump coupled to a controllable switch.

8. An aeroponic system comprising:
   a permeable receptacle with a top opening for receiving a base of a plant;
   a first enclosure disposed below the permeable receptacle and at least partially surrounding the permeable receptacle, the first enclosure being devoid of plant medium;
   a second enclosure at least partially enveloping the first enclosure, a bottom portion of the first enclosure comprising a perforated divider having a root passage through perforations of the perforated divider between the first enclosure and the second enclosure, the second enclosure being devoid of plant medium; and
   a fluid delivery system comprising:
      a vertical supply line extending from a top of the first enclosure into a first interior space enclosed by the first enclosure, a first flow path extending from the vertical supply line toward a center of the first interior space, the vertical supply line extending vertically from the first interior space into a second interior space enclosed by the second enclosure, a second flow path extending from the vertical supply line toward a center of the second interior space;
      the first flow path comprising a first delivery loop with one or more apertures conveying a fluid from a fluid source communicatively coupled to the fluid delivery system into the first interior space enclosed by the first enclosure,
      the second flow path comprising a second delivery loop with apertures conveying the fluid from the fluid source to the second interior space enclosed by the second enclosure, the first delivery loop being disposed above the root passage and the second delivery loop being disposed below the root passage;
      a vent opening disposed on an outer wall; and
      a drainage opening disposed at a bottom portion of the second enclosure;
   a timer set to control a first schedule for delivering water into the fluid delivery system and to control a second schedule for delivering purified oxygen gas into the fluid delivery system, the first schedule not overlapping with the second schedule;
   the fluid source comprising a water source communicatively coupled to the fluid delivery system and controlled by the timer; and a purified oxygen generator communicatively coupled to the fluid delivery system and controlled by the timer.

9. The aeroponic system of claim 8, further comprising a switch to convey the purified oxygen gas from the oxygen source according to the second schedule.

10. The aeroponic system of claim 8, wherein the water source comprises a first reservoir communicatively coupled to a second reservoir, the first reservoir comprising a float and the second reservoir comprising a pump to replenish the first reservoir when the float reaches a predetermined level.

11. The aeroponic system of claim 10, wherein the drainage opening is communicatively coupled to the first reservoir or the second reservoir.

12. An aeroponic system comprising:
   a permeable receptacle with a top opening for receiving a base of a plant;
   a first enclosure disposed below the permeable receptacle and at least partially surrounding the permeable receptacle, the first enclosure being devoid of plant medium;
   a second enclosure at least partially enveloping the first enclosure, a bottom portion of the first enclosure comprising a perforated divider having a root passage through perforations of the perforated divider between the first enclosure and the second enclosure, the second enclosure being devoid of plant medium; and
   a fluid delivery system comprising:
      a vertical supply line communicatively coupled to a fluid source extending from a top of the first enclosure into a first interior space enclosed by the first enclosure, a first flow path extending from the vertical supply line toward a center of the first interior space, the vertical supply line extending vertically from the first interior space into a second interior space enclosed by the second enclosure, a second flow path extending from the vertical supply line toward a center of the second interior space;
      the first flow path conveying a fluid from the fluid source into the first interior space enclosed by the first enclosure via a first delivery loop disposed above the divider, the second flow path conveying the fluid from the fluid source to the second interior space enclosed by the second enclosure via a second delivery loop disposed below the divider;
      a vent opening disposed on an outer wall; and
      a drain opening disposed at a bottom portion of the second enclosure;
   a timer set to control a first schedule for delivering water into the fluid delivery system and to control a second schedule for delivering purified oxygen gas into the fluid delivery system, the first schedule not overlapping with the second schedule;
   the fluid source comprising a water source communicatively coupled to the fluid delivery system and the timer; and
   a purified oxygen generator communicatively coupled to the fluid delivery system and the timer.

13. The aeroponic system of claim 12, further comprising a pump coupled to the water source, the pump conveying water from the water source into the vertical supply line according to the first schedule.

14. The aeroponic system of claim 12, further comprising a pump coupled to the oxygen source, the pump conveying the purified oxygen gas into the fluid delivery system according to the second schedule.

* * * * *